J. B. WALLACE.
PLOW.
APPLICATION FILED JUNE 24, 1918.
1,335,212. Patented Mar. 30, 1920.
3 SHEETS—SHEET 1.
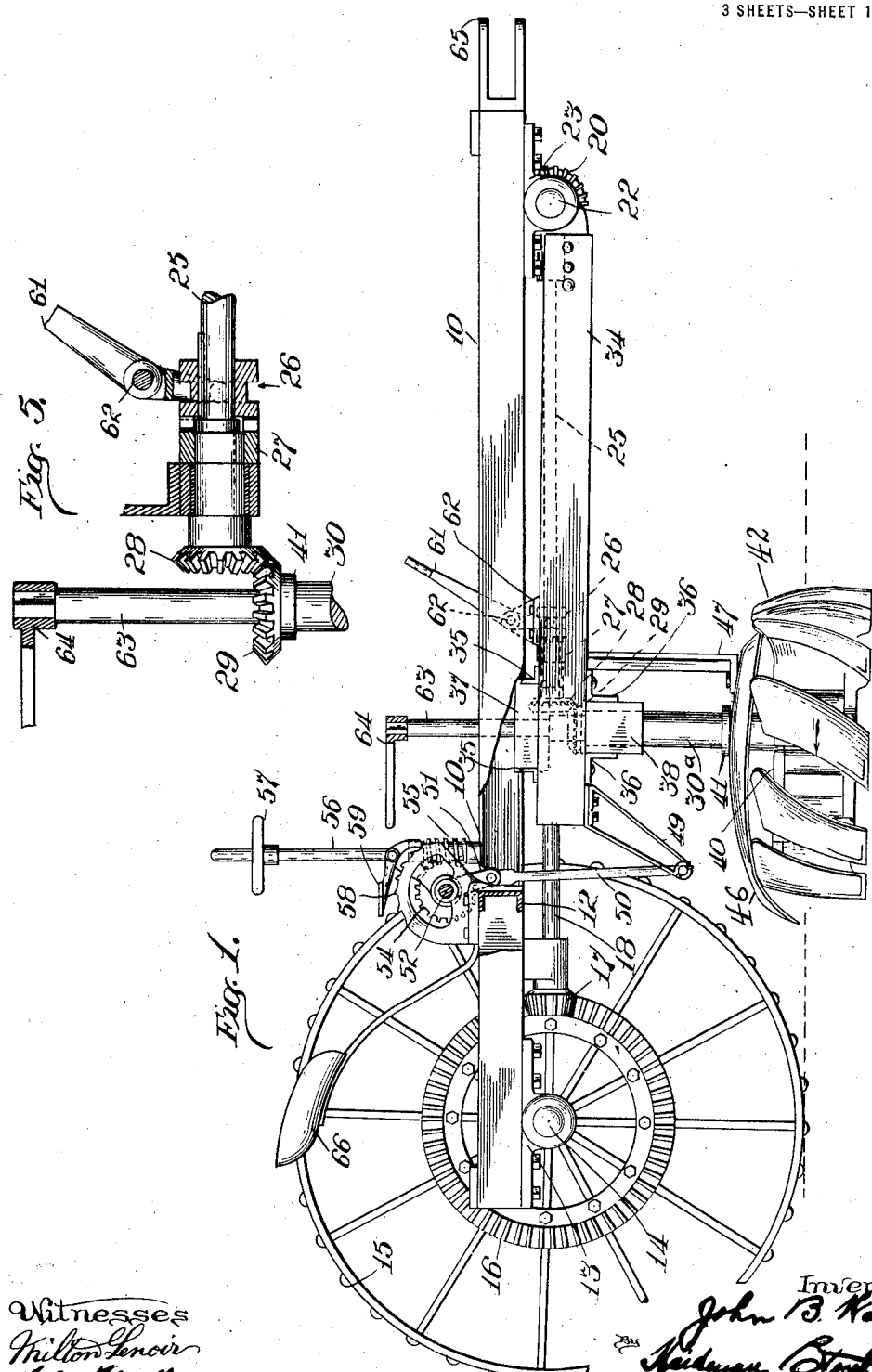

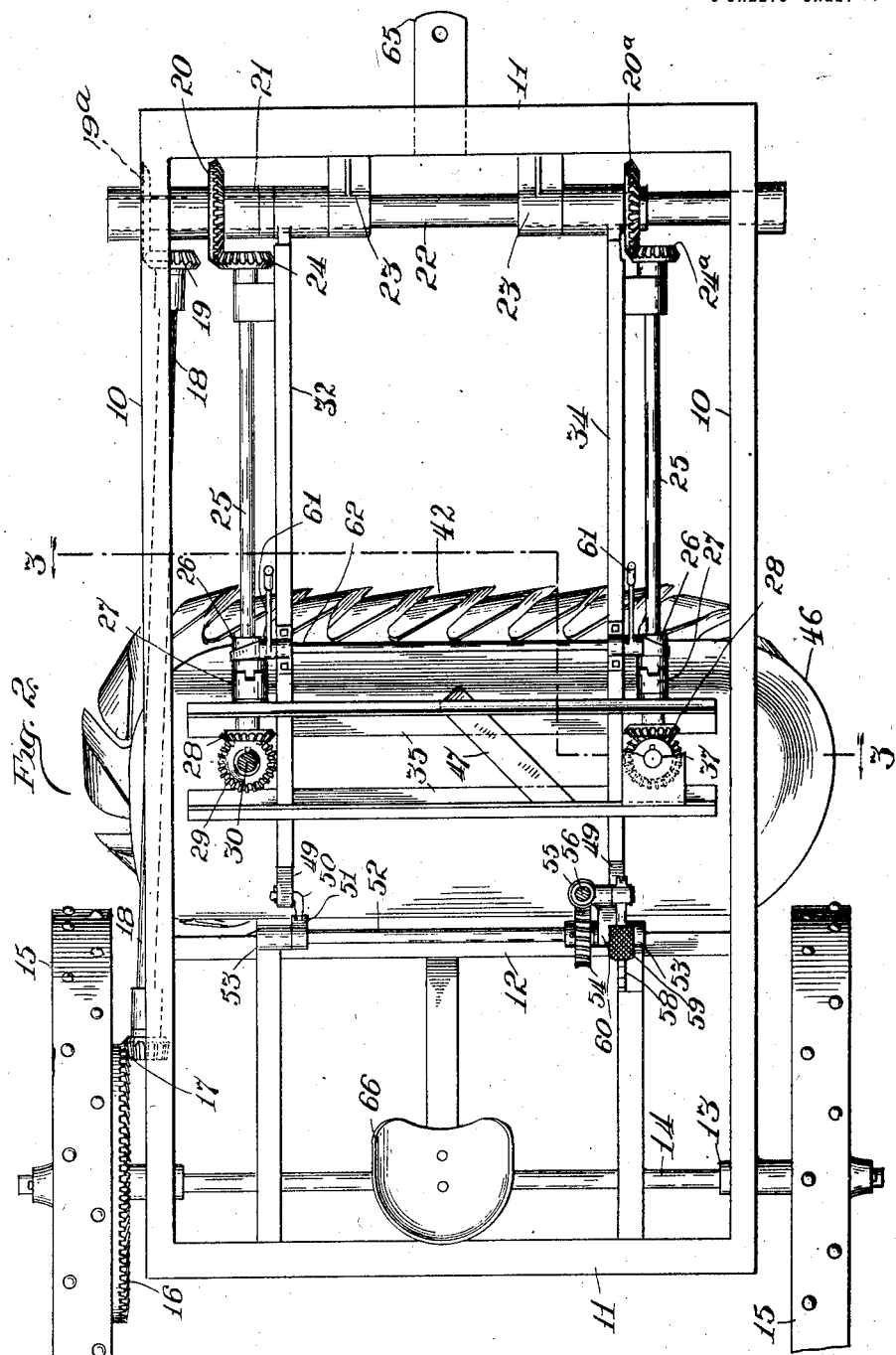

J. B. WALLACE.
PLOW.
APPLICATION FILED JUNE 24, 1918.

1,335,212.

Patented Mar. 30, 1920.
3 SHEETS—SHEET 3.

Witnesses
Milton Lenoir
F. A. Flovell.

Inventor
John B. Wallace,
By Heidman Bros.
Attorneys ns and caused to be thrown onto and
UNITED STATES PATENT OFFICE.

JOHN B. WALLACE, OF MUKWONAGO, WISCONSIN.

PLOW.

1,335,212.

Specification of Letters Patent. Patented Mar. 30, 1920.

Application filed June 24, 1918. Serial No. 241,470.

*To all whom it may concern:*

Be it known that I, JOHN B. WALLACE, a citizen of the United States, and a resident of Mukwonago, in the county of Waukesha, and State of Wisconsin, have invented certain new and useful Improvements in Plows, of which the following is a description, reference being had to the accompanying drawings, which form a part of my specification.

My invention relates to what may be termed a rotary plow or tillage machine wherein a plurality of plow-shares are secured to an endless element, or pivotally secured together to form an endless element or belt adapted to travel in a direction transversely of the direction of travel of the machine or plow; the endless member, or plow-share element being adapted to rotate or move at a speed commensurate with the forward speed of the machine or plow proper; movement or power in the present exemplification, being imparted to said endless element, or plow-share element, by one of the supporting wheels of the machine through suitable intermediate mechanism.

The object of my invention is to provide a tillage machine or plow whereby the soil will be cut or plowed into thin strips or portions and caused to be thrown onto and moved across a suitable apron or shield, which will also cause the soil to be broken up and then delivered rearward of the endless element in such manner as will cause a further breaking up of the earth, with the result that the soil and fertilizer become thoroughly mixed during the plowing operation and a seed-bed provided ready for planting, thus obviating the necessity for disking, harrowing and dragging or rolling the plowed earth as is necessary with the present type of plow employed.

My invention contemplates the provision of a rotary plow or tillage machine provided with a plurality of plow-shares formed into or secured to an endless member or element, adapted to rotate about vertically disposed axes; with the member or endless element preferably traveling the full width of the plow or machine, and each plow-share traveling through a path at an angle to the path of the machine; the angle of cut of the plow-shares depending upon the relative speed of the machine forward and the speed of the plow-shares or endless cutting element.

A further object of my invention is to provide a plow, or tillage machine of the class herein described, wherein the plow-share element may be readily lifted out of, or adjusted in its cutting relation with the ground; and wherein the plow-share element may also be quickly disconnected from the driving mechanism or power-imparting means, and reverse rotation or movement of the element made possible when occasion requires.

The above enumerated objects and the advantages inherent in my construction will be more fully comprehended from the following detailed description of the accompanying drawings, wherein:—

Figure 1 is a partial side elevation and partial longitudinal sectional view of my improved plow or tillage machine.

Fig. 2 is a top plan view with portions broken away and in section.

Fig. 5 is a detail view, partially in section, with portions broken away, of the power-disengaging means or clutch.

Figure 3:
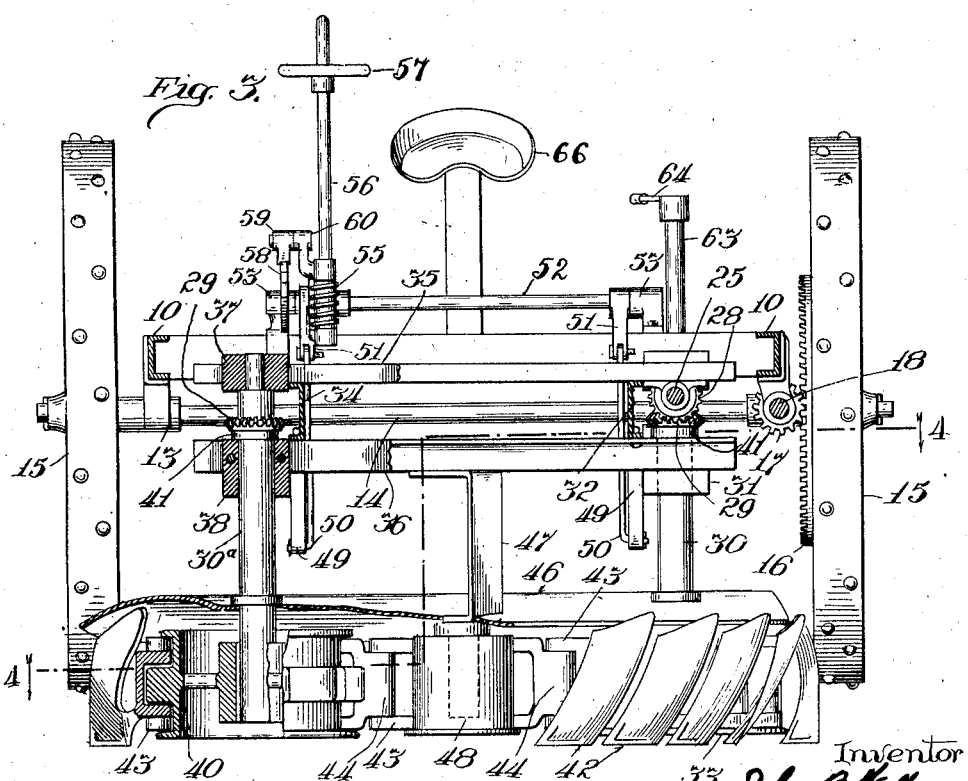
Fig. 3 is a cross sectional view taken on the line 3—3 of Fig. 2 looking in the direction of the arrows.

In the particular exemplification of the invention as disclosed in the drawings, the machine comprises a suitable frame consisting of the side member or sills 10, 10, and two end members 11, 11, which are preferably shown formed of suitable channel members or bars, see Figs. 1 and 3, suitably secured together and provided at a point adjacent what may be termed the rear end of the frame with a cross-member or bar 12.

One end of the frame has the side members or sills provided with suitable hangers or journal-boxes, as shown at 13 in Fig. 1, to provide bearings for the axle or journal 14, on the outer ends of which are mounted wheels 15, 15; the wheels being preferably provided with studs or cleats on the fellies as shown, in order to provide suitable traction. The wheel which is adapted to be on the land side of the plow, that is the wheel which rides along on the unplowed ground, is shown provided with a circumferential or crown gear 16, of suitable diameter and has meshing with it bevel gear 17 secured on the end of a rod or shaft 18 which is disposed lengthwise of the frame and toward the front end thereof, where the rod or shaft is also provided with a bevel gear 19 arranged in mesh with a bevel gear 19ª which is secured to a shaft 22. A gear 20 is mounted on shaft 22 and shown provided with a suitable hub or spacing portion 21 to assist in maintaining adjacent elements in place; the gear 20 being keyed or secured on shaft 22 which is rotatably mounted in the front end of the frame by means of hangers 23. The gear 20 meshes with a bevel gear 24 secured to the end of one of a pair of shafts 25, 25 which extend rearwardly; the other shaft 25 being driven by a gear 20ª on shaft 22, meshing with gear 24ª on said shaft 25. The rear ends of both shafts 25, 25 are provided with clutch elements 26, 26, see Figs. 2 and 5, slidably keyed thereon; the clutch elements 26, 26 being adapted to form clutching engagement with clutch elements 27, 27 which are keyed, or otherwise properly secured to, the end of the hubs or extensions of bevel gears 28, 28 which are in mesh with bevel gears 29, 29 secured respectively to vertically disposed shafts 30 and 30ª.

Figure 4:
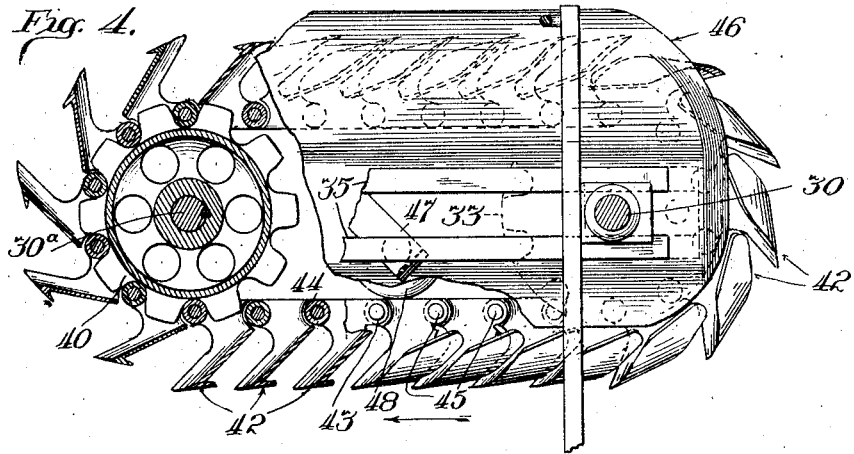
Fig. 4 is a sectional view taken on the line 4—4 of Fig. 3 looking in the direction of the arrows.

The shaft 30 has suitable bearing in the housing 31 mounted on the rear end of a beam 32, see Fig. 3; while the lower end of the shaft 30 is provided with a suitable sprocket-wheel 33, shown in dotted lines in Fig. 4. The opposite side of the machine is also provided with a beam 34, similar to beam 32, and both of these beams are loosely mounted on shaft 22 at the forward end of the machine, as shown in Figs. 1 and 2, so as to permit the beams to swing in a vertical direction. The rear ends of the beams 32 and 34 are shown provided with cross-bars 35 and 36, secured, respectively, to the top and bottom sides of said beams, see Figs. 2 and 3, so as to provide a rigid composite movable frame. The ends of the cross-bars 35 and 36, opposite to the ends at which shaft 30 is located, are provided with suitable bearings 37 and 38 for vertically disposed shaft 30ª. The lower end of shaft 30ª is provided with a sprocket-wheel 40, similar in construction to sprocket-wheel 33. The vertically disposed shafts 30, 30ª, as clearly shown in Fig. 3, are each provided with a suitable collar or flange 41 in order to prevent vertical displacement of the shaft.

Disposed about sprocket-wheels 33 and 40 is an endless element, which may be in the nature of a suitable endless belt or chain, or preferably formed by means of the plow-shares 42 pivotally secured together; each plow-share being provided, at what may be termed the rear or inner side thereof and at one end of said side, with a pair of outwardly disposed ears or lobes, as shown at 43 in Fig. 3, while the other end of said side is provided with a single outwardly disposed ear or lobe 44; the latter lobe being adapted to extend between the pair of lobes or ears 43 of the adjacent plow-share. All of the lobes or ears are provided with suitable bolt or pin-receiving openings for the passage of suitable bolts or pins, indicated at 45, whereby the respective plow-shares 42 are pivotally secured together in an endless manner, as shown in Fig. 4, to permit them to pass about the sprocket-wheels. The plow-shares 42 are, of course, provided with the forwardly disposed cutting points; with the forwardly disposed faces of the shares curved upwardly and inwardly toward the inside of the element as shown, to provide the wings or mold-board portions whereby the plowed ground will be forced to ride upwardly along the forwardly presented concaved side of the plow-share and be caused to fall onto a suitable shield or apron shown at 46, preferably formed of sheet metal, which is arranged across the top of the endless element and curves or slopes slightly rearwardly beyond the rear or non-cutting side of the endless element, as shown. The shield or apron 46 will cause the plowed ground, consisting of a multiple of thin slices or portions, to be carried across the top of the endless element and to the rear of the operating side of the plow. The shield or apron 46 is shown suitably supported from the cross-member 36 by means of a hanger or bracket 47, see Figs. 1 and 3.

The hanger or bracket 47, which is supported from the cross-bar or member 36, also provides suitable support for an intermediate bearing member 48, see Fig. 3, shown in the nature of a flanged roller adapted to provide support, intermediate of sprocket-wheels 33 and 40, for the endless plow-share element at the forward or cutting side thereof; the flange at the lower end of the bearing member 48 being adapted to extend beneath the interlocked lobes or ears, so as to prevent any possible sag of the endless element intermediate of the sprocket-wheels as well as to prevent any backward flexing thereof. The sprocket-wheels 33 and 40 are also preferably provided at their bottoms with suitable flanges as shown in Fig. 3, to extend beneath the interlocked lobes or ears of adjacent plow-shares to provide suitable support for the shares and thus prevent too much pressure on the sprockets of the sprocket-wheels 33 and 40.

The rear ends of the beams 32 and 34 are each provided with a bracket, as at 49, see Fig. 1, to which are pivotally secured the depending rods 50. The opposite ends of the rods 50 are each pivotally secured to a link-member 51, which latter (there being preferably one for each beam and rod) are properly secured to a rotatable shaft 52 disposed transversely of the frame and mounted in suitable brackets, as at 53 in Figs. 2 and 3. The shaft 52 is provided with a worm-gear 54 secured thereto so as to cause shaft and gear to rotate together, and this gear 54 is in mesh with a worm 55 formed on the lower end of the upright shaft 56 provided with a suitable hand-wheel 57. The shaft 56 is mounted in a suitable bracket, secured to a cross-member of the frame of the machine, whereby the shaft 56 with its worm 55 is maintained in constant mesh with worm-gear 54.

It is evident from this construction that rotation of shaft 56, in proper direction, will induce shaft 52 to be rotated through the medium of worm 55 and worm-gear 54, thereby causing links 51 to exert an upward pull on rods 50 and cause the rear ends of the beams 32 and 34 to be elevated, which, in turn, lift the plow-share element out of the soil, if the lifting of the beams 32 and 34 has been done to a sufficient extent. At the same time, it is evident that the extent to which the plow-share element is in cutting or plowing relation with the soil, namely the depth of the furrow, may also be regulated or controlled by the mechanism just described.

In order that the raising or regulating of the plow-share element may be quickly accomplished, the worm and worm-gear may be of a quick-acting type or pitch, and for that reason I prefer to provide the machine with suitable holding mechanism shown in the nature of a toothed quadrant 58 secured on a non-movable portion of the frame of the machine and a holding dog or pawl 59 pivotally secured on a suitable bracket 60 keyed to shaft 52 so as to move therewith; the pawl 59 being preferably formed so that it may be actuated or released by the foot of the operator. It is apparent from this construction that when the plow-share element has been raised, this raised position may be maintained by the pawl 59 engaging with an adjacent tooth of the quadrant member 58.

In order that the transmission of power to the endless plow-share element may be controlled and operation of the element prevented, I prefer to provide the clutches shown in detail in Fig. 5, with the clutch elements 26, 26 controlled by either one of two levers 61, 61 which are secured to a rod 62 which extends across and is rotatably mounted on beams 32 and 34 see Figs. 1 and 2; with the lower ends of the levers 61 operatively engaging with the clutch elements 26 so that oscillation of levers 61 will cause the clutch elements 26 to move lengthwise of shafts 25, either into or out of clutching engagement with the hubs of gears 28. With this construction, operation of the plow-share element may be quickly discontinued regardless of the continued movement of the plow or machine proper.

The shaft 30 has an extension 63 and the upper end thereof shown provided with a suitable operating lever or handle 64. The purpose of this extension and lever is to enable the operator to reverse the operation of the endless plow-share element should occasion require, as, for example, if roots, etc., are encountered and it is desired to disengage the element therefrom. In order to permit the operator, however, to move the endless plow-share element in reverse or non-cutting direction, it is necessary to first move the clutch mechanism out of clutching position.

The front end of the frame is provided with a suitable clevis or attaching member 65; and at a suitable point at the rear end of the frame, namely at a point where the operator would be within easy reach of the various controlling members, the plow is shown provided with a suitable operator's seat 66 secured to the cross-members of the frame in any proper manner.

As is evident from the construction shown and described, with my invention the ground is not only plowed or cut into a multiple of thin slices or portions, but the ground or soil is further broken up in its passage across the apron or shield and in the dumping or dropping action from the shield or apron onto the ground rearward of the endless plow element. This action causes the soil to become thoroughly mixed and in one and the same operation, provides a seed-bed ready for planting; with the fertilizer thoroughly mixed through the soil or seed-bed.

The path through the ground, or cut of each plow-share is at an angle to the path of travel of the machine; the angle depending upon the relative speed of the plow-share element and the speed of the machine in its advance. If the speed of the machine's travel in a forward direction and the speed of the endless plow-share element are the same, the path through the ground of the plow-share or endless plow element will be at an angle of approximately forty-five degrees to the path of the machine over the ground and the furrows cut by the plows will be of a width equal to the distance that the plow-shares are spaced apart. The speed of the plow-share element, however, should always be a trifle greater than the speed of the machine forward in order to prevent back pressure on the plow-share element. If the speed of the plow-share element is twice the speed of the machine forward, then the angle of the cut or passage through the ground will be approximately twenty-two and one-half degrees relative to the path of the machine forward; and the strips or portions cut by each plow-share will be one-half as wide as the plow-shares are spaced apart. It is evident therefore from the foregoing that the width of the furrows cut by the plows, the fineness to which the soil is broken up and the thoroughness with which it will be mixed up, depend upon the relative speeds of the machine forward and the plow-share element. In other words, the greater the speed of the plow-share element, relative to the speed of the machine forward, the finer will be the seed-bed or slices and portions cut by the respective plow-shares; with the result that the thin portions of plowed ground which are tumbled onto and across the apron or shield will be further broken up and more thoroughly mixed. With the present type of plow employed, the seed-bed must generally be obtained by disking, harrowing and dragging or rolling the plowed ground; which operations, however, only break up the top or upper portion of the plowed ground and do not result in a complete breaking up and mixture of the entire layer of overturned soil; as the plow at present in use is merely a cutting wedge, that cuts, wedges up and turns over a layer of the top soil. If this soil is sod, it remains practically unbroken; or if of different nature, it is merely broken into large lumps substantially as hard as the unbroken or unplowed soil; the outer side of these lumps, in many soils, being the only portion to become softened by subsequent rains.

Furthermore, with the present type of plows employed, the fertilizer, which has been previously spread on the surface of unplowed ground, is turned underneath the large layer or lumps, with the result that plant life receives practically no benefit from the fertilizer until sufficient growth has been attained and the roots sufficiently developed to reach the under-turned fertilizer. On the other hand, with my improved construction, the manure and fertilizer will be evently distributed through the seed-bed; becoming thoroughly mixed throughout the more or less finely broken up soil; being mixed through the entire depth of the furrow, so that plant life will not only get the full benefit of the fertilizer, but will obtain the benefit at a time when it is most needed, to-wit at the initial growth thereof, enabling the plants to get a good start.

It is also evident from the operation of my improved plow that the seed-bed provided thereby will more thoroughly hold moisture than is the case with the seed-bed provided by the plows at present in use.

As the soil is plowed or cut into thin slices or portions by the multiple of plow-shares, it is evident that no relatively great amount of power will be necessary to operate my construction, because the only friction with the ground or coil will be on the front side of the plow-shares and the pressure will be that of a number of narrow strips or portions instead of a broad one as is the case with the plows at present in use. All other friction and all the pressure is taken care of by the supporting members of my plow, which will reduce it to a minimum, as a result of the metal to metal construction; whereas in the type of plows at present in use considerable friction is had on the back side and bottom of the plow-share in its passage through the earth, with all the pressure and weight of the plow supported and encountered by the plow-share.

My invention permits the plow or machine to be operated at a higher speed than is the case with the present type of plows; and as plowing is less than half the work necessary for preparing a seed-bed, it is evident that my improved construction greatly enhances the efficiency of an operator in tilling the soil; and at the same time better crops may be obtained because of the thorough mixture of the seed-bed and the fact that the thoroughly broken-up soil will hold moisture more thoroughly than is the case with the ordinary plowed ground, especially in arid regions.

I have shown and described what I believe to be the simplest adaptation of my invention; but certain modifications might be made, without, however, departing from the spirit of my invention.

What I claim is:—

1. A plow, comprising a wheeled supporting frame, a plurality of plow-shares pivotally connected together in an endless manner and disposed transversely of said frame, the plow-shares being arranged to travel substantially in a horizontal path about a vertically disposed axis, means whereby the respective plow-shares are successively brought into cutting position, and means whereby the position of all of said plow-shares relative to the ground will be controlled.

2. A plow, comprising a wheeled supporting frame, a second frame pivotally secured to the first frame so as to permit vertical movement thereof, a plurality of plow-shares pivotally secured together in an endless manner and carried by said second mentioned frame, means whereby the plow-shares are made to travel transversely of said frames through a horizontally disposed orbit about a vertically disposed axis, and means whereby vertical movement of the second frame may be controlled.

3. A plow, comprising a wheeled supporting frame, rotatable carrying means carried by said frame at opposite sides thereof, and a plurality of plow-shares pivotally secured together into an endless element and disposed about said rotatable carrying means so as to constantly travel parallel with the ground, transversely of the plow and adapted to be successively moved by said carrying means into cutting position, and means for controlling the position of said carrying means and the plow-share element relative to the ground.

4. A plow, comprising a wheeled frame, rotatable carrying means carried by said frame at opposite sides thereof, a plurality of plow-shares pivotally secured together into an endless element and arranged to travel in a horizontal path, transversely of the plow about said rotatable carrying means so as to be moved thereby, power-imparting means whereby the first mentioned means are rotated, and means for controlling the position of said first means relative to the ground.

5. A plow, comprising a wheeled frame, a second frame pivotally secured at one end to the first frame so as to permit vertical movement thereof, rotatable carrying means carried by said second frame at the free end thereof, a plurality of plow-shares pivotally secured together so as to provide an endless element, said plow-share element being disposed about said rotatable carrying means and arranged to travel through a horizontal path in the ground in a direction transversely of said frames, and power-imparting means whereby said rotatable carrying means are operated.

6. A plow, comprising a wheeled frame, vertically adjustable rotatable carrying means carried beneath said frame, a plurality of plow-shares secured together to provide an endless element and disposed about said rotatable carrying means so as to continuously travel about the same in cutting relation, parallel with the ground when said carrying means is in lowered position, positive means intermediate of said first means and a wheel of said frame whereby said first means may be continuously rotated at a predetermined speed.

7. A plow, comprising a wheeled supporting frame, a second frame pivotally secured in the first frame so as to permit vertical movement, rotatable carrying means carried by said second frame, a plurality of plow-shares pivotally secured together into an endless element and disposed about said rotatable carrying means so as to be moved thereby, means intermediate of said first mentioned means and one of the wheels of the supporting frame whereby the first mentioned means and the plow-share element are given movement, and means whereby the operative relation between the first mentioned means and the plow-share element may be controlled.

8. A plow, comprising a wheeled supporting frame, a second frame pivotally secured in the first frame so as to permit vertical movement, rotatable carrying means carried by said second frame, a plurality of plow-shares pivotally secured together to form an endless element and disposed about said rotatable carrying means so as to be moved thereby, means whereby the rotatable carrying means are operated and the plow-shares successively brought into cutting position, and means whereby the vertical position of the second frame may be controlled.

9. A plow, comprising a wheeled supporting frame, a second frame pivotally secured at its forward end to the first frame so as to permit vertical movement, rotatable carrying means carried by said second frame and depending beneath the same, a plurality of plow-shares pivotally secured together into an endless element adapted to continuously travel about said rotatable carrying means in parallel relation with the ground in a direction transversely of the frame, means intermediate of the rotatable means and a wheel of the supporting frame whereby the rotatable carrying means may be continuously rotated and the plow-shares successively brought and maintained in cutting relation with the ground, and means whereby the vertical position of the second frame may be controlled and the depth of cut by said plow-shares determined.

10. A plow, comprising a wheeled supporting frame, rotatable carrying means carried by said frame and disposed in a direction transversely of said frame, a plurality of plow-shares pivotally secured together to provide an endless element disposed about said rotatable carrying means so as to be moved thereby, power-imparting means whereby said rotatable carrying means and the plow-share element carried thereby are operated, and means adapted to receive the plowed ground from said plow-share element to convey the same rearward of said plow-share element.

11. A plow, comprising a wheeled frame, rotatable carrying means carried by the frame and disposed in a direction transversely thereof, a plurality of plow-shares pivotally secured together so as to provide an endless element disposed about said rotatable carrying means so as to be moved thereby, means whereby the rotatable carrying means are operated when the plow moves forward, and means disposed above said plowshare element and adapted to convey the plowed ground across the plow-share element to the rear or non-cutting side thereof.

12. A plow, comprising a wheeled supporting frame, a second frame pivotally secured to the first frame so as to permit vertical movement, rotatable carrying means carried by the second frame and arranged in a direction transversely thereof, a plurality of plow-shares pivotally secured together so as to provide an endless element disposed about said rotatable carrying means so as to be moved thereby, means whereby the rotatable carrying means may be operated, means disposed across the plow-shaft element and adapted to receive the plowed ground to convey the same rearward of the plow-share element, and means secured on the supporting frame and adapted to control the vertical position of the second frame and the elements carried thereby.

13. A plow, comprising a wheeled supporting frame, rotatable carrying means carried thereby, a plurality of plow-shares pivotally secured together into an endless element and disposed about said rotatable carrying means so as to be operated thereby, means whereby rotative movement is given to the first mentioned means, and means whereby reverse movement of the first mentioned means and the plow-share element may be induced.

14. A plow, comprising a wheeled supporting frame, rotatable carrying means carried thereby, a plurality of plow-share elements pivotally secured together to form an endless element disposed about said rotatable carrying means and adapted to be operated thereby, means adapted to receive the plowed ground to convey the same rearward of the plow-share element, means whereby rotation of the rotatable carrying means may be induced, means whereby the operative relation between the rotatable carrying means and the third mentioned means may be controlled, and means whereby reverse movement of the first mentioned means and the plow-share element may be induced.

15. A plow, comprising a supporting frame, and a plurality of plow-shares arranged to travel at an angle to the line of draft about a vertically disposed axis and adapted to cut furrows of equal depth throughout at angles of the line of draft.

16. A plow, comprising a supporting frame, a plurality of plow-shares arranged to travel at an angle to the line of draft and substantially parallel beneath the surface of the ground, and means whereby the position of the plow-shares may be controlled and the depth of the furrows regulated.

17. A plow, comprising a supporting frame, a plurality of plow-shares arranged to travel at an angle to the line of draft and substantially parallel with the ground, means whereby the position of the plow-shares may be controlled and the depth of the furrows regulated, and means whereby the plowed ground is conveyed out of the path of the plow-shares.

18. A plow, having a supporting frame, a plurality of plow-shares pivotally secured together into an endless element and arranged to travel in a horizontal path when in cutting position at the forward side of the plow, said plow-shares being arranged to travel transversely of said supporting frame, and means for imparting power to said plow-shares.

JOHN B. WALLACE.

Witnesses:
FRANK A. McKENZIE,
LOUIS F. HUNTER.

It is hereby certified that in Letters Patent No. 1,335,212, granted March 30, 1920, upon the application of John B. Wallace, of Mukwonago, Wisconsin, for an improvement in "Plows," an error appears in the printed specification requiring correction as follows: Page 6, line 7, claim 12, for the compound word "plow-shaft" read *plow-share;* and that the said Letters Patent should be read with this correction therein that the same may conform to the record of the case in the Patent Office.

Signed and sealed this 22d day of June, A. D., 1920.

[SEAL.]

M. H. COULSTON,
*Acting Commissioner of Patents.*

Cl 97—39.